(12) United States Patent
Kunii (10) Patent No.: US 6,386,348 B1
(45) Date of Patent: May 14, 2002

(54) POWER TRANSMISSION DEVICE FOR A FOUR-WHEEL DRIVE VEHICLE

(75) Inventor: Rikiya Kunii, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/722,308

(22) Filed: Nov. 28, 2000

(30) Foreign Application Priority Data

Dec. 3, 1999 (JP) ............................................. 11-345279

(51) Int. Cl.[7] ..................... B60K 17/348; B60K 17/02; B60K 23/08; F16D 41/06
(52) U.S. Cl. .................... 192/35; 192/48.3; 192/85 AA; 192/103 F
(58) Field of Search ........................... 192/48.3, 85 AA, 192/103 F, 48.92, 35; 180/233, 242

(56) References Cited

U.S. PATENT DOCUMENTS

| | | | |
|---|---|---|---|
| 5,219,038 A | * 6/1993 | Hamada et al. | 180/248 |
| 5,890,574 A | * 4/1999 | Takahashi | 190/35 |
| 6,330,928 B1 | * 12/2001 | Sekiya et al. | 180/242 |
| 2001/0002629 A1 | * 6/2001 | Arai et al. | 180/233 |

FOREIGN PATENT DOCUMENTS

| | | |
|---|---|---|
| JP | 03-224830 | 10/1991 |
| JP | 09-202152 | 8/1997 |

* cited by examiner

Primary Examiner—Rodney H. Bonck
Assistant Examiner—Saúl Rodríguez
(74) Attorney, Agent, or Firm—Armstrong, Westerman & Hattori, LLP (57) ABSTRACT

A multiple plate clutch 11 is provided between a drive shaft 5 continuously extending to front wheels which are main wheels and a driven shaft continuously extending to rear wheels. which are sub-drive wheels for distributing a part of the torque on the front wheels to the rear wheels. A tow-way clutch mechanism in which the drive shaft 5 is connected to a single hydraulic pump 26 via a clutch outer 17 and a sleeve 31 locks when the rotation speed of the drive shaft 5 exceeds the rotation speed of the driven shaft 6 beyond a predetermined rate to thereby drive the hydraulic pump 26 so as to put the vehicle in a four-wheel drive condition, irrespective of the straight-ahead or straight-backward running operation of the vehicle, i.e., irrespective of the rotating direction of the drive shaft 5. Since only a minute torque is applied to the two-way clutch mechanism to drive the hydraulic pump 26, the torque transmission capacity of the two-way clutch 32 can be decreased, whereby the miniaturization and cost reduction of the device can be attempted at being attained.

4 Claims, 7 Drawing Sheets

NEUTRAL STATE

FIG. 4B

LOCKING STATE

FIG. 4C

UNLOCKNG STATE

NEUTRAL STATE

FIG. 7B

LOCKING STATE

FIG. 7C

UNLOCKNG STATE

POWER TRANSMISSION DEVICE FOR A FOUR-WHEEL DRIVE VEHICLE

BACKGROUND OF THE INVENTION

1. Field of the Invention

The present invention relates to a power transmission device for a four-wheel drive vehicle comprising main drive shafts to which the torque of an engine is directly transmitted and sub-drive wheels to which a part of the torque of the engine is indirectly transmitted via a drive shaft, a hydraulic clutch and a driven shaft.

2. Description of the Related Art

The power transmission device for a four-wheel drive vehicle is known through JP-A-3-224830. This power transmission device is constructed such that a hydraulic pressure closed circuit is constituted by a first hydraulic clutch adapted to interlock with the front wheels for rotation and a second hydraulic pump adapted to interlock with the rear wheels for rotation and that the hydraulic clutch is adapted to lock under hydraulic pressure generated in the hydraulic pressure closed circuit by a differential rotation between the front and rear wheels, whereby the part of the torque on the front wheels is transmitted to the rear wheels. A direction selector valve for selectively changing fluid paths is provided in the hydraulic pressure closed circuit in order to compensate for the change in direction in which hydraulic fluid is discharged by the first and second hydraulic pumps which takes place when the vehicle changes its running direction from the straight-ahead running direction to a reverse running direction, so that a four-wheel driving condition is realized, irrespective of the running direction of the vehicle.

Additionally, a power transmission device for a four-wheel drive vehicle of this type is disclosed in JPA-9-202152. In this power transmission device, a drive shaft adapted to interlock with front wheels which are main drive wheels for rotation and a driven shaft adapted to interlock with rear wheels which are sub-drive wheels are connected to each other via a multiple disc clutch, and a two-way clutch mechanism is provided on the driven shaft. The two-way clutch mechanism has a function to distribute the torque on the front wheels to the rear wheels so as to improve the running through performance of the vehicle by locking when the front wheels slip and the rotation speed of the front wheels exceeds the rotation speed of the rear wheels in either of cases where the vehicle runs straight ahead and where the vehicle runs backward, as well as a function to unlock so that the torque on the front wheels is not distributed to the rear wheels to thereby avoid an adverse effect to the operation of an ABS (anti-lock brake system) when the front wheels lock and the rotation speed of the front wheels become lower than the rotation speed of the rear wheels.

The power transmission device described in the aforesaid JP-A-3-224830 requires two hydraulic pumps and therefore, the device has a drawback that the number of components used, the man hours involved in assembling those components, the weight of the device and the production cost thereof are increased.

In addition, the power transmission device described in the aforesaid JP-A-9-202152 has the two-way clutch mechanism provided on the driven shaft for transmitting the torque on the front wheels to the rear wheels and therefore, the torque is directly transmitted via the two-way clutch mechanism. This requires the use of a two-way clutch mechanism that has a large torque transmission capacity and which is expensive, causing problems that the power transmission device becomes larger and that the production cost is increased.

SUMMARY OF THE INVENTION

The invention was made in view of the above situations, and an object thereof is to provide a power transmission device for a four-wheel drive vehicle which enables the miniaturization thereof and cost reduction therefor by reducing the number of hydraulic pumps, as well as the torque transmission capacity of the two-way clutch mechanism.

With a view to attaining the above object, according to a first aspect of the invention, there is provided a power transmission device for a four-wheel drive vehicle comprising main drive wheels to which the torque of an engine is directly transmitted and sub-drive wheels to which a part of the torque of the engine is indirectly transmitted via a drive shaft, a hydraulic clutch and a driven shaft, wherein the hydraulic clutch locks under hydraulic pressure generated by a hydraulic pump driven by the drive shaft via a two-way clutch mechanism, the power transmission device being characterized in that, the two-way clutch locks when the rotation speed of the drive shaft exceeds the rotation speed of the driven shaft, irrespective of the rotating direction of the drive shaft, so as to drive the hydraulic pump.

According to the above construction, the two-way clutch mechanism is put in a non-locking condition at the time of straight-ahead constant speed running operation of the vehicle where the rotation speed of the main drive wheels coincides with the rotation speed of the sub-drive wheels and also at the time of braking operation of the vehicle which is running straight ahead where the rotation speed of the main drive wheels lowers below the rotation speed of the sub-drive wheels. As a result of this, the hydraulic pump is disengaged from the driving shaft and outputs no hydraulic pressure, and therefore, the hydraulic clutch is put in a non-locking condition, whereby the vehicle is maintained in a two-wheel drive condition.

On the other hand, the two-way clutch mechanism is put in a locking condition at the time of straight-ahead start-up and accelerating operations of the vehicle where the rotation speed of the main drive wheels exceeds the rotation speed of the sub-drive wheels, and therefore, the hydraulic pump is driven by the drive shaft to output a hydraulic pressure, and the hydraulic clutch is put in a locking condition, whereby the vehicle is switched over to a four-wheel drive condition.

Although the rotating direction of the respective components of the power transmission device when the vehicle runs straight backward becomes opposite to that when the vehicle runs straight ahead, the two-way clutch mechanism locks when the rotation speed of the drive shaft exceeds that of the driven shaft, irrespective of the rotating direction of the drive shaft, and therefore, as in the case of straight-ahead running operation, the two-way clutch mechanism is put in the non-locking condition at the time of straight-backward constant speed running operation of the vehicle and also at the time of braking operation of the vehicle which runs straight backward, whereby the vehicle can be maintained in the two-wheel drive condition, whereas the two-way clutch mechanism is put in the locking condition at the time of straight-backward start-up and accelerating operations of the vehicle, whereby the vehicle can be switched over to the four-wheel drive condition.

Then, there being no chance of the torque which is transmitted from the main drive wheels to the sub-drive wheels directly acting on the two-way clutch mechanism, only a minute torque for driving the hydraulic pump acts on the two-way clutch mechanism, and therefore, the torque transmission capacity of the two-way clutch mechanism can be small, so that the size and production cost of the same mechanism can be attempted at being decreased. Additionally, only one hydraulic pump is required, and therefore, this can contribute to the reduction of the number of components used in the two-way clutch mechanism, the man hours involved in assembling the components into the same mechanism, the weight of the mechanism and the production coast thereof. Moreover, the hydraulic pump is designed to be actuated only when the rotation speed of the main drive wheels exceeds the rotation speed of the sub-drive wheels, and therefore, energy needed to drive the hydraulic pump can be maintained as small as possible, whereby the fuel consumption of the engine can be reduced to save on fuel used.

According to a second aspect of the invention, there is provided a power transmission device for a four-wheel drive vehicle as set forth in the first aspect above, wherein the two-way clutch mechanism comprises a first clutch element connected to the drive shaft, a second clutch element connected to the hydraulic pump and a direction selector valve connected to the driven shaft via a friction member in such a manner as to allow a slip.

According to the above construction, the direction selector element is connected to the driven shaft via the friction member in such a manner as to allow a slip, and therefore, even when the difference in rotation speed between the main drive wheels and the sub-drive wheels, a risk of an excessive load being applied to the direction selector element can be eliminated, thereby making it possible to securely maintain the durability of the two-way clutch mechanism.

According to a third aspect of the invention, there is provided a power transmission device for a four-wheel drive vehicle as set forth in the second aspect above, wherein a speed increasing unit is interposed between the direction selector element of the two-way clutch mechanism and the driven shaft for increasing the rotation speed of the driven shaft for transmission to the direction selector element.

According to the above construction, the rotation speed of the driven shaft is increased by the speed increasing unit for transmission to the direction selector element, and therefore, it is not until the rotation speed of the main drive wheels exceeds the rotation speed of the sub-drive wheels beyond the speed increasing rate of the speed increasing unit that the two-way clutch locks. Consequently, even if a slight difference in rotation speed between the main drive wheels and the sub-drive wheels occurs when the vehicle makes a tight turn or is driven to be parked in a parking slot, since the two-way clutch mechanism does not lock, a tight corner braking phenomenon can be avoided, whereby the vehicle is prevented from being put in the four-wheel drive condition unnecessarily, thereby making it possible to reduce the fuel consumption of the engine to save on fuel used.

According to a fourth aspect of the invention, there is provided a power transmission device for a four-wheel drive vehicle as set forth in the first aspect above, wherein the two-way clutch mechanism is disposed coaxially in the interior of the hydraulic pump.

According to the above construction, since the two-way clutch is disposed coaxially in the interior of the hydraulic pump, the axial dimension of the power transmission device can be reduced.

DETAILED DESCRIPTION OF THE PREFERRED EMBODIMENTS

A mode for carrying out the invention will be described below with reference to embodiments illustrated in the accompanying drawings.

Figure 1:
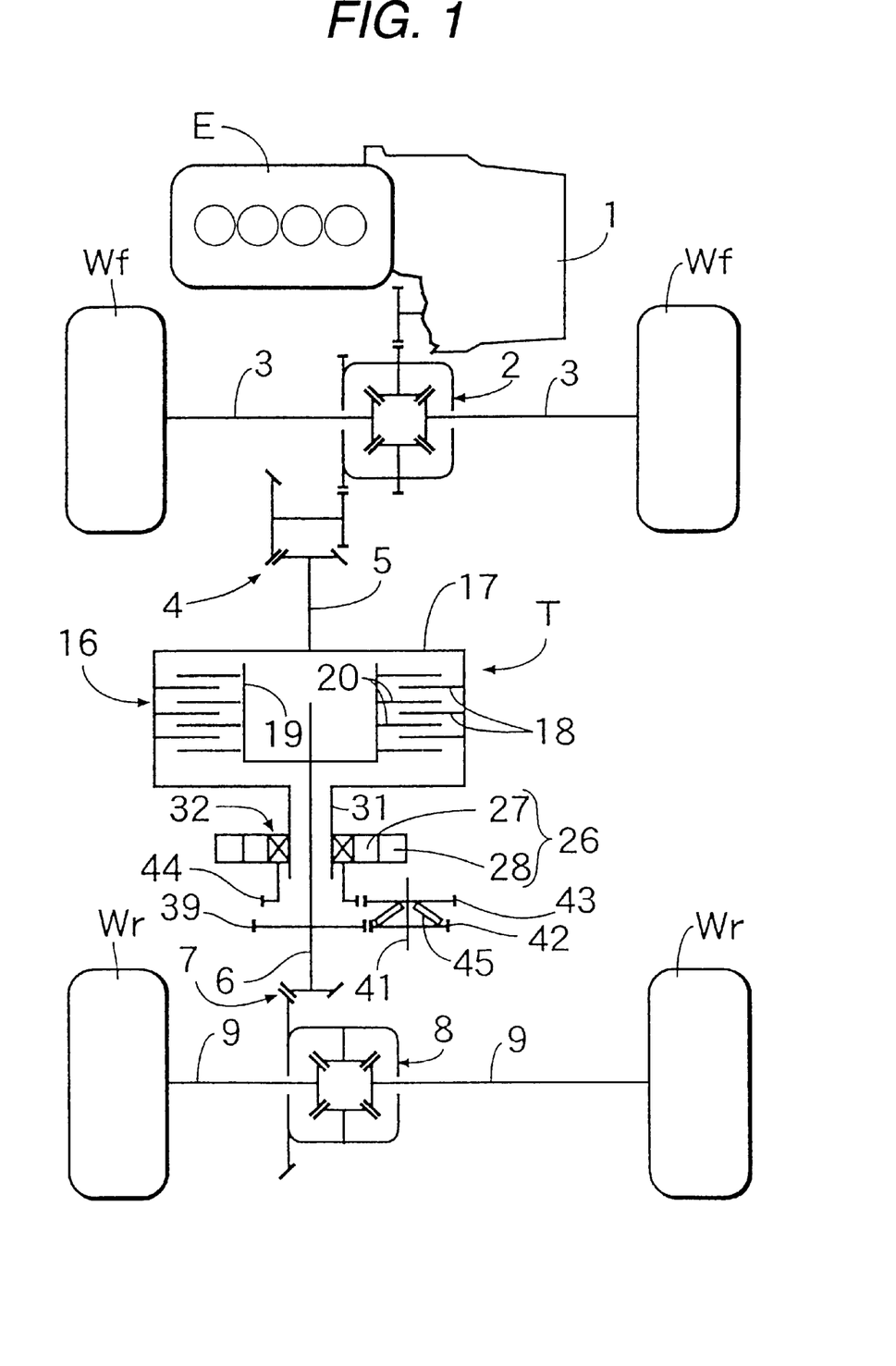
FIG. 1 is a diagram showing the overall construction of power transmission system of a four-wheel drive vehicle.
Figure 2:
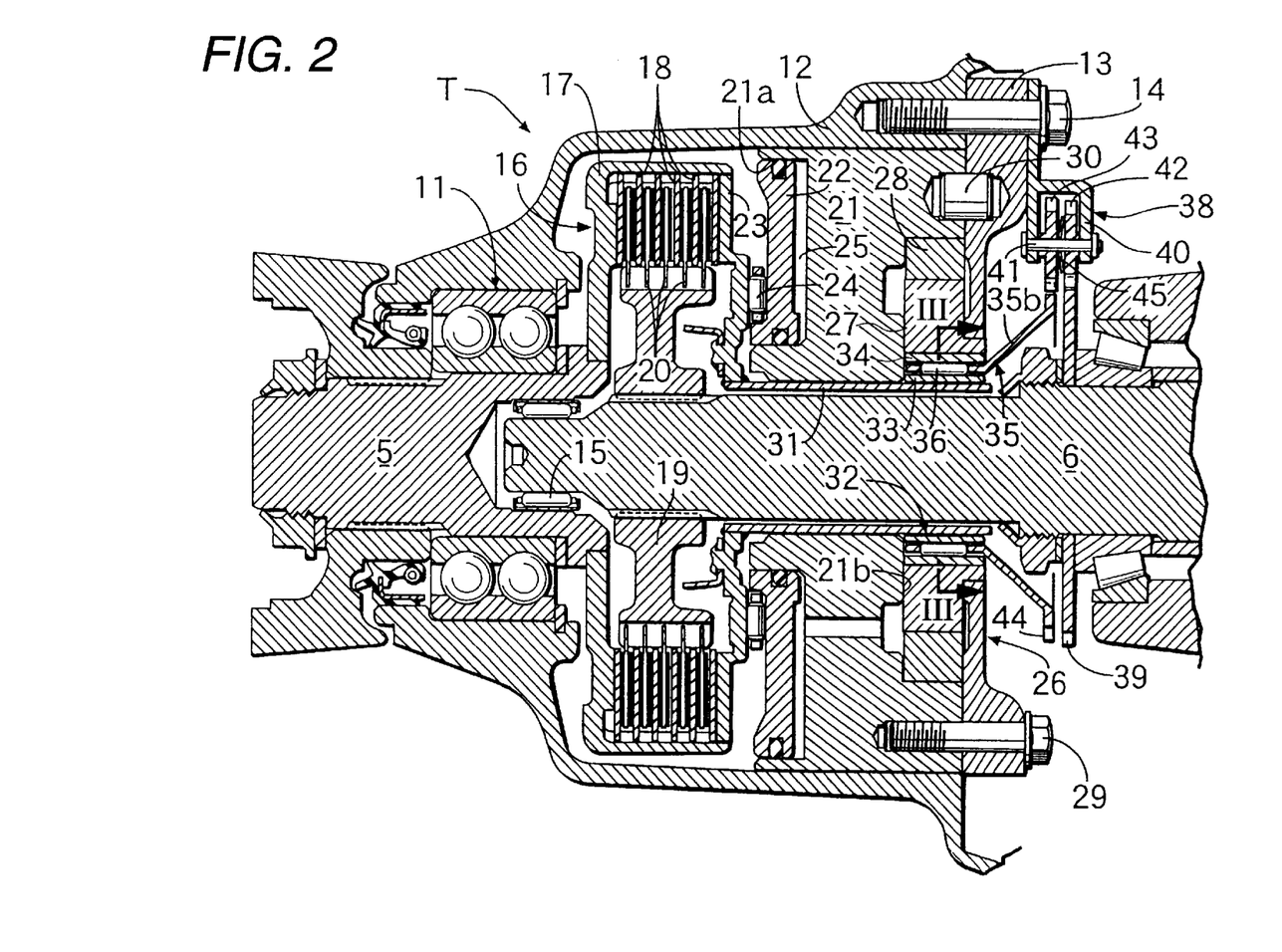
FIG. 2 is a diagram showing the construction of a power transmission device.

FIGS. 1 to 5 show a first embodiment of the invention. As shown in FIGS. 1 and 2, an output from an engine E mounted at the front of a four-wheel drive vehicle is inputted into a differential gear unit 2 on a front wheel side via a transmission 1, and an output from the differential gear unit 2 is then transmitted to left and right front wheels Wf, Wf which are main drive wheels via drive axles 3, 3. The output from the engine E inputted into the differential gear unit 2 is inputted into a power transmission device T, which will be described later, via a bevel gear set 4 and a drive shaft 5, and an output from the power transmission device T is transmitted to a differential gear unit 8 on a rear wheel side via a driven shaft 6 and a bevel gear set 7. Moreover, an output from the differential gear unit 8 is then transmitted to left and right rear wheels Wr, Wr which are sub-drive wheels via drive axles 9, 9.

The power transmission device 5 includes a casing 12 for supporting a rear portion of the drive shaft 5 via a ball bearing 11, and a cover 13 is bolted with bolts 14 . . . to a rear opening of the casing 12. The driven shaft 6 extends through the cover 13 into the casing 12 and is relatively rotatably supported at a front end thereof within an inner circumference of a rear end of the driving shaft 5 via a roller bearing 15.

A hydraulic clutch 16 for controlling the effectuation and interruption of torque transmission between the drive shaft 5 and the driven shaft 6 includes a plurality of friction engagement members 18 . . . spline fitted in a clutch outer 17 adapted to rotate together with the drive shaft 5, a plurality of friction engagement members 20, . . . spline fitted on a clutch inner 19 adapted to rotate together with the driven shaft 6, a clutch cylinder 21a formed in a pump housing 21, a clutch piston 22 slidably supported in the clutch cylinder 21a, a pressure plate 23 spline fitted in the clutch outer 17 and a thrust bearing 24 disposed between the clutch piston 22 and the pressure plate 23.

Consequently, when hydraulic fluid discharged by a hydraulic pump 26, which will be described later, is supplied to a clutch fluid chamber 25 in the clutch cylinder 21a, the pressure plate 23 pressed by the clutch piston 22 which is then being caused to advance via the thrust bearing 24 brings both the friction engagement members 18 . . . , 20 . . . , into tight contact with each other, whereby the hydraulic clutch 16 locks and the drive shaft 5 and the driven shaft 6 are made integral. In this hydraulic clutch 16 locking condition, torque is transmitted from the front wheels Wf, Wf to the rear wheels Wr, Wr, whereas in a hydraulic clutch disengaging condition, the transmission of torque from the front wheel Wf, Wf to the rear wheels Wr, Wr is interrupted.

For example, the hydraulic pump 26 constituted by a trochoid pump includes an inner rotor 27 and an outer rotor 28 which are accommodated in a pump chamber 21b formed in the pump housing.21, and one side of the respective inner rotor 27 and outer rotor 28 is covered with the cover 13 secured to the pump housing 21 with bolts 29 . . . and a pin 30.

Figure 3:
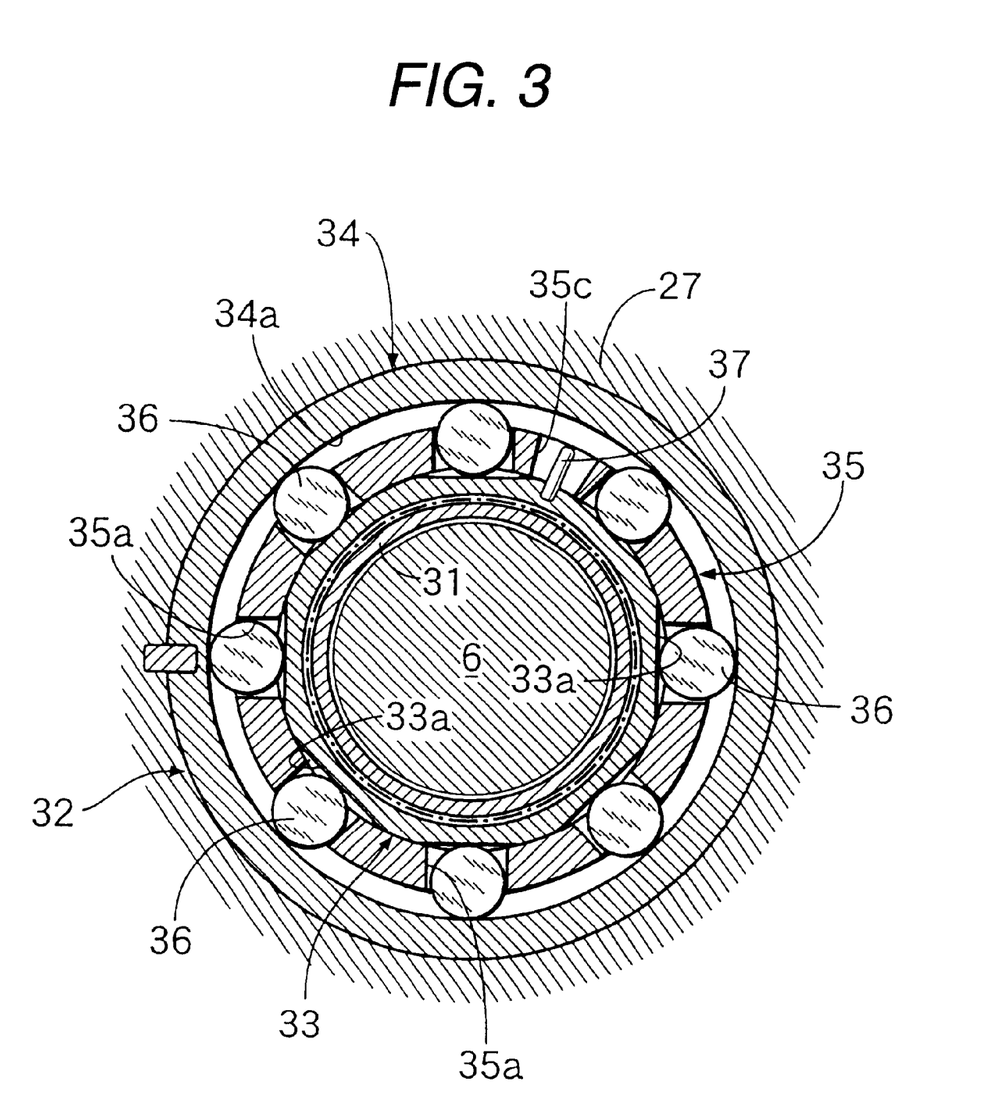
FIG. 3 is an enlarged cross-sectional view taken along the line III—III of FIG. 2.

As is clear from FIGS. 2 and 3, a front end of a sleeve 31 relatively rotatably fitted over the outer circumference of the driven shaft 6 is fixed to a radially inner end of the pressure plate 23 of the hydraulic clutch 16, and a two-way clutch mechanism 32 is disposed between the outer circumference of the sleeve 31 at a rear end thereof and the inner circumference of the inner rotor 27 of the hydraulic pump 26. The two-way clutch mechanism 32 includes a ring-like first clutch element 33 located radially inwardly and splined to the sleeve 31, a second clutch element 34 disposed coaxially with and outwardly of the first clutch element 33 and splined to the inner circumference of the inner rotor 27, an annular direction selector element 35 relatively rotatably disposed between the first and second clutch elements 33, 34, and a plurality of rollers 36 supported in such a manner as to be fitted in, respectively, a plurality of pockets 35a formed in the direction selector element 35 at predetermined intervals.

Figure 4A:
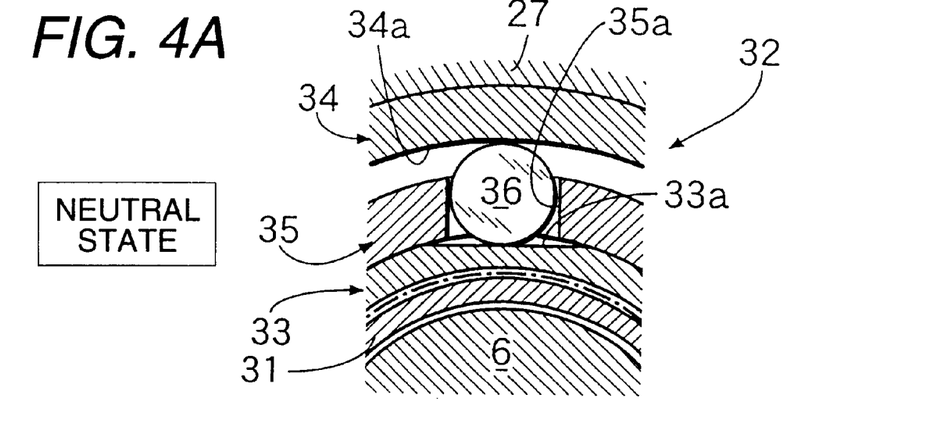
FIGS. 4A to 4C are explanatory diagrams explaining the operation of a two-way clutch mechanism.

Flat planes 33a . . . are formed on the outer circumferential surface of the inner first clutch element 33 at positions corresponding to the pockets 35a, whereas arc-like surface 34a is formed on the inner circumferential surface of the outer second clutch element 34. Consequently, the rollers 36 . . . are surrounded by the flat surfaces 33a . . . of the first clutch element 33, the arc-like surface 34a of the second clutch element 34 and the pockets 35a of the direction selector element 35 and is held in place therein. An angular range within which the direction selector element 35 can rotate relatively to the first clutch element 33 is controlled through the engagement of a pin 37 protruding radially from the first clutch element 33 into a notch 35b formed in the direction selector element 35. Additionally, the direction selector element 35 is biased toward a neutral position as shown in FIG. 4A with a spring (not shown).

Figure 4B:
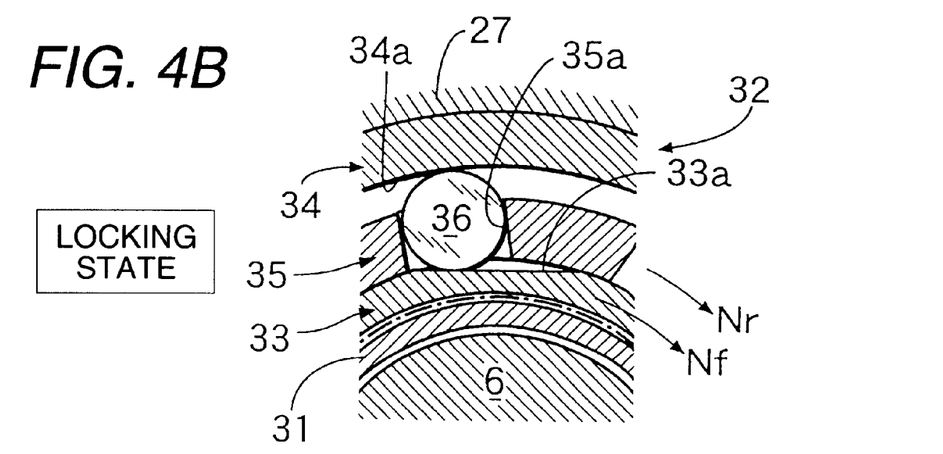
Figure 4C:
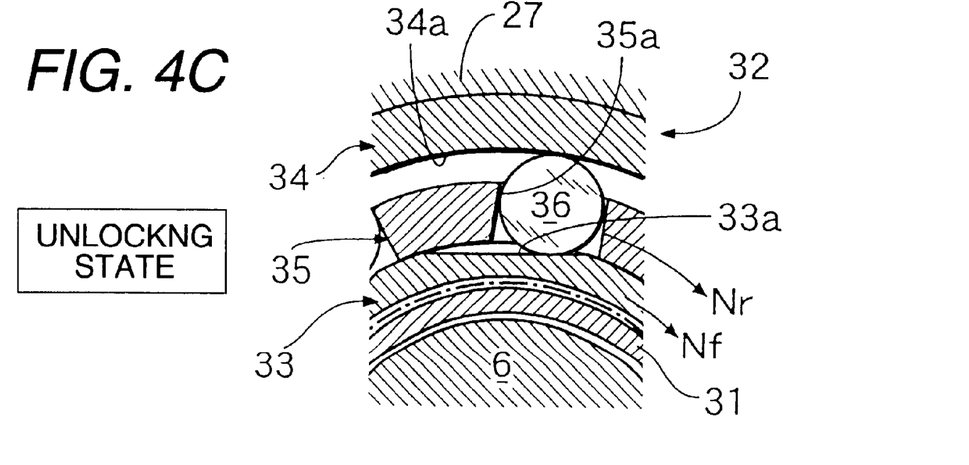

As shown in FIGS. 4B, 4C, when the vehicle runs ahead, the first clutch element 33 connected to the drive shaft 5 and the direction selector element 35 connected to the driven shaft 6 both rotate in a direction indicated by arrows. When this occurs, as shown in FIG. 4B, in the event that the rotation speed Nf of the first clutch element 33 exceeds the rotation speed Nr of the direction selector element 35, the direction selector element 35 deviates the phase thereof toward a delay side in the rotating direction relative to the first clutch element 33, whereby the two-way clutch mechanism 32 locks so that torque is transmitted from the first clutch element 33 to the second clutch element 34, and the hydraulic pump 26 is driven by the drive shaft 5 via the clutch outer 17 and the sleeve 31. In addition, as shown in FIG. 4C, in the event that the rotation speed Nr of the direction selector element 35 exceeds the rotation speed Nf of the first clutch element 33, the direction selector element 35 deviates the phase thereof toward an advance side in the rotating direction relative to the first clutch element 33, whereby the two-way clutch mechanism 32 unlocks so that the transmission of torque from the first clutch element 33 to the second clutch element 34 is interrupted, and the driving of the.hydraulic pump 26 is then interrupted.

Although, when the vehicle runs backward, the first clutch element 33 and the direction selector element 35 of the two-way clutch mechanism 32 rotate in a direction opposite to the direction described above, also at this time of backward running operation, in the event that the rotation speed Nf of the first clutch 33 exceeds the rotation speed Nr of the direction selector element 35, the two-way clutch locks, whereas in the event that the rotation speed Nr of the direction selector element 35 exceeds the rotation speed Nf of the first clutch element 33, the two-way clutch 32 unlocks.

A speed increasing unit 38 for connecting the direction selector element 35 of the two-way clutch mechanism 32 to the driven shaft 6 is constituted by a first gear 39 fixed to the outer.circumference of the driven shaft 6, second and third gears 42, 43 independently rotatably supported, respectively, on an intermediate shaft 41 supported at a bracket 40 provided on the cover 13, a fourth gear 44 provided at a distal end of an arm 35b integrally extending from the direction selector element 35 and a cloned disc spring 45 disposed between the second and third gears 42, 43 as a friction member. Consequently, when the rotation of the driven shaft 6 is transmitted to the direction selector element 35 via the first gear 39, the second gear 42, the third gear 43 and the fourth gear 44, the rotation speed is increased in the order of several percent. Additionally, when the pin 37 reaches an end of the notch 35d to control the rotation of the direction selector element 35, the second and third gears 42, 43 slip relative to each other via the cloned disc spring 45, and the transmission of torque from the driven shaft 6 to the direction selector element 35 is interrupted, and therefore, any risk of an excessive load being applied to the two-way clutch mechanism 32 can be avoided to thereby improve the durability thereof.

Thus, since the power transmission device is provided with only one hydraulic pump 26, when compared to one provided with two hydraulic pumps, the same device can contribute the reduction of the number of components used therein, man hours involved in assembling the components there into, weight and production cost thereof. Moreover, as will be described later, since the hydraulic pump 26 is actuated only when the rotation speed Wf of the front wheels Wf, Wf exceeds the rotation speed of the rear wheels Wr, Wr at a predetermined rate, energy needed to drive the hydraulic pump 26 is controlled to stay as small as possible so as to reduce the fuel consumption to thereby save on fuel. Additionally, since the two-way clutch mechanism 32 is disposed on the outer circumference of the driven shaft 6 with the hydraulic pump 26 being disposed on the outer circumference of the two-way clutch mechanism 32, the axial dimension of the power transmission device T can be decreased.

Figure 5:
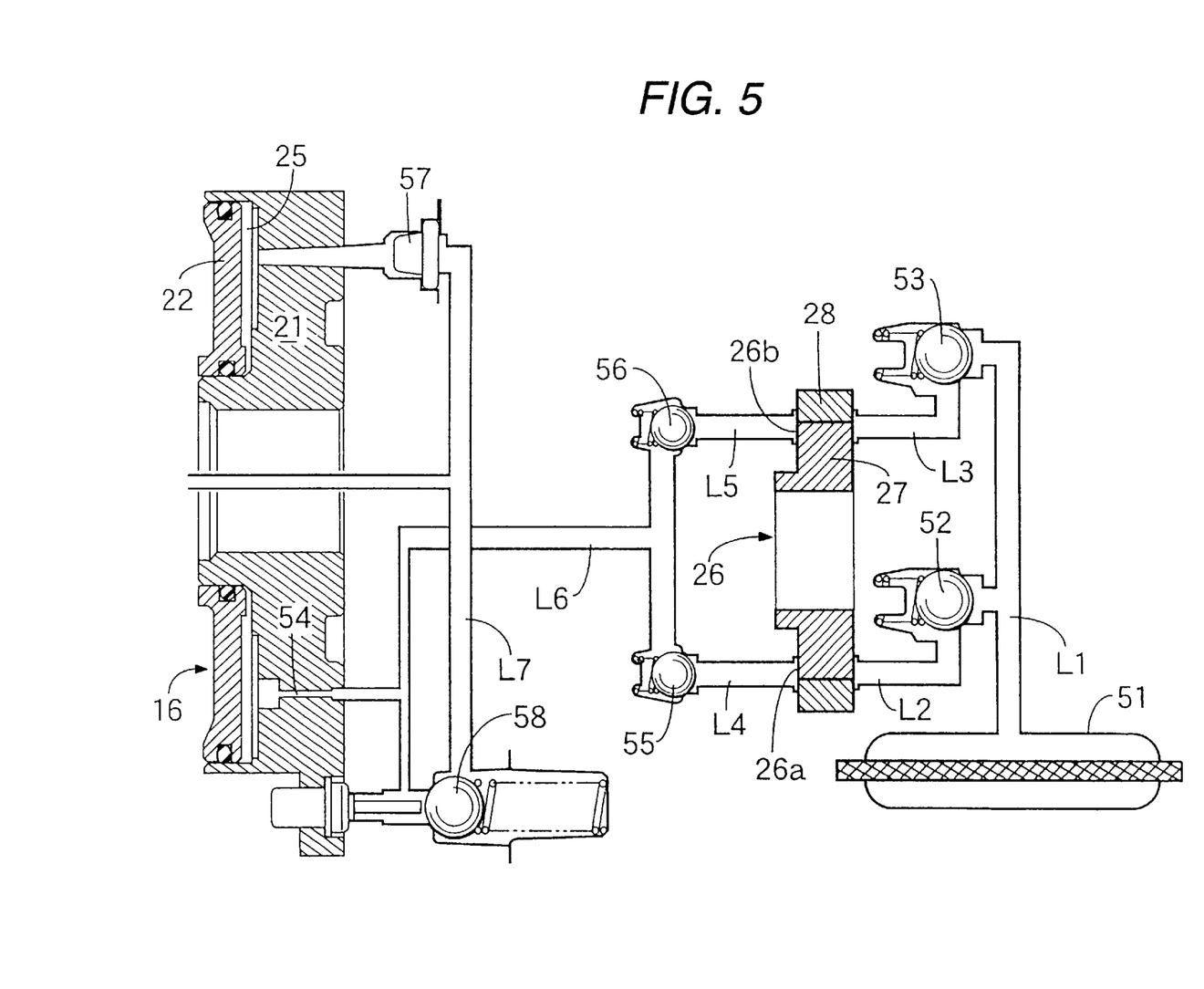
FIG. 5 is a diagram showing a hydraulic pressure circuit for actuating a hydraulic clutch.

As is shown in FIG. 5, a hydraulic fluid intake passage L1 extending from an oil tank 51 branches into a fist hydraulic fluid intake passage L2 and a second hydraulic fluid intake passage L3, which are connected to a first port 26a and a second port 26b of the hydraulic pump 26, respectively. Check valves 52, 53 are provided along the first hydraulic fluid intake passage L2 and the second hydraulic fluid intake passage L3, respectively, for permitting only the passage of hydraulic fluid from the oil tank 51 side to the hydraulic pump 26 side. A first hydraulic fluid discharge passage L4 and a second hydraulic fluid discharge passage L5 extending, respectively, from the first port 26a and the second port 26b of the hydraulic pump 26 join a hydraulic fluid discharge passage L6 and communicate with a fluid chamber 25 in the hydraulic clutch 16 via choke 54 for controlling the rising characteristics of hydraulic pressure. Check valves 55, 56 are provided along the first hydraulic fluid discharge passage L4 and the second hydraulic fluid discharge passage L5, respectively, for permitting only the passage of hydraulic fluid from the hydraulic pump 26 side to the hydraulic clutch 16 side. A hydraulic fluid return passage L7 for returning hydraulic fluid to the oil tank 51 and the fluid chamber 25 of the hydraulic clutch 16 are connected by an orifice 57 for generating a hydraulic pressure in the fluid chamber 25, and in order to control an upper limit for the hydraulic pressure applied to the fluid chamber 25, a hydraulic fluid discharge passage L6 is connected to the hydraulic fluid return passage L7 by a relief valve 58.

Thus, in the event that the hydraulic pump 26 rotates in one direction when the vehicle runs ahead, the first port 26a becomes a high pressure discharge port, and the second port 26b a low pressure intake port, and therefore, the two check valves 52, 56 close, whereas the two check valves 53, 55 open. As a result, hydraulic fluid in the oil tank 51 is supplied into the fluid chamber 25 of the hydraulic clutch 16 via the check valve 53, the second port 26b, the first port 26a, the check valve 55 and the choke 54, and the hydraulic fluid reaching there is then returned from there to the oil tank 51 via the orifice 57. At this time, the clutch piston 22 is pressed by virtue of a hydraulic pressure acting to the fluid chamber 25, and this causes the hydraulic clutch 16 to lock, whereby the torque on the front wheels Wf, Wf is distributed to the rear wheels Wr, Wr.

On the contrary, in the event that the hydraulic pump 26 rotates in the other direction when the vehicle runs straight backward, the second port 26b becomes a high pressure discharge port and the first port 26a a low pressure intake port, and therefore, the two check valve 53, 55 close and the two check valves 52, 56 open. As a result, the hydraulic fluid in the oil tank 51 is supplied into the fluid chamber 25 of the hydraulic clutch 16 via the check valve 52, the first port 26a, the second port 26b, the check valve 56 and the choke 54, and the hydraulic fluid reaching there is then returned from there to the oil tank 51 via the orifice 57. At this time, the clutch piston 22 is pressed by virtue of a hydraulic pressure acting to the fluid chamber 25, whereby the hydraulic clutch 16 is caused to lock so as to distribute the torque on the front wheels Wf, Wf to the rear wheels Wr, Wr.

As is described above, even if the rotating direction of the hydraulic pump 26 changes in conjunction with the straight ahead and backward running operations of the vehicle, the hydraulic pressure is supplied to the fluid chamber 25 of the hydraulic clutch 16 without any problem so as to produce a four-wheel drive condition.

Next, the operation of the embodiment constructed described above will,be described below.

(1) Straight-ahead Constant Speed Running Operation of the Vehicle

When the vehicle runs straight ahead at a constant speed with the front wheels Wf, Wf and the rear wheels Wr, Wr rotating at the same speed, the rotation speeds of the drive shaft 5 and the driven shaft 6 become equal, but since the rotation speed Nr of the direction selector element 35 of the two-way clutch mechanism 32 connected to the driven shaft 6 via the speed increasing unit 38 exceeds the rotation speed Nf of the first clutch element 33, the two-way clutch mechanism 32 is caused to unlock (refer to FIG. 4C). Assault, the hydraulic pump 26 is disconnected from the drive shaft 5, generating no hydraulic pressure, whereby the hydraulic clutch 16 unlocks, and the distribution of torque from the front wheels Wf, Wf to the rear wheels Wr, wr is interrupted, the vehicle being thereby put in a two-wheel drive condition.

(2) Straight-ahead Start Up Operation or Straight-ahead Acceleration Operation of the Vehicle When the front wheels Wf , Wf slip on a road surface having a low friction coefficient due to abrupt start up or abrupt acceleration, the rotation speed of the front wheels Wf, Wf exceeds the rotation speed of the rear wheels Wr, Wr. At this time, in the event that the rotation speed of the front wheels Wf, Wf exceeds the rotation speed of the rear wheels Wr, Wr beyond the speed increasing rate of the speed increasing unit 38, since the rotation speed Nf of the first clutch element 33 of the two-way clutch mechanism 32 exceeds the rotation speed Nr of the direction selector element 35.thereof, the two-way clutch locks (refer to FIG. 4B). As a result, the hydraulic pump 26 is driven by the drive shaft 5 and the hydraulic clutch 16 locks by virtue of a hydraulic pressure generated by the hydraulic pump 26, whereby the part of the torque on the front wheels Wr, Wf is distributed to the rear wheels Wr, Wr, the vehicle being thereby put in a four-wheel drive condition so as to improve the running through performance thereof.

When the vehicle is put in the four-wheel drive condition, the magnitude of torque that is distributed to the rear wheels Wr, Wr can be increased as the difference in rotation between the front wheels Wf, Wf and the rear wheels Wr, Wr increases, or as the slip amount of the front wheels Wf, Wf increases. Additionally, the torque transmission from the front wheels Wf, Wf to the rear wheels Wr, Wr is effected by the hydraulic clutch 16, and therefore, since only a minute torque to drive the hydraulic pump 26 is transmitted to the two-way clutch mechanism 32, a two-way clutch mechanism 32 having a small torque transmission capacity can be used and this can contribute not only to the reduction of the size and weight of the power transmission device but also to the improvement of the durability thereof.

(3) Braking Operation of the Vehicle Running Straight Ahead

When the brakes are applied abruptly or panically while the vehicle is running on a road surface having a low friction coefficient, since in general the braking force on the front wheels Wf, Wf is designed to exceed the braking force on the rear wheels Wr, Wr, the front wheels Wf, Wf are first put in a locking condition, whereby there may be occurring a case where the rotation speed of the rear wheels Wr, Wr exceeds the rotation speed of the front wheels Wf, Wf. In a case like this, when the hydraulic clutch 16 locks so as to produce a four-wheel drive condition, since there may be a possibility that the operation of an ABS (an anti-lock brake system) is adversely affected to deteriorate the braking performance, the vehicle needs to be maintained in the two-wheel drive condition when the brakes are applied while running straight ahead.

While the vehicle is running straight ahead as described above, the rotation speed Nf of the first clutch element 33 of the two-way clutch mechanism 32 lowers below the rotation speed Nr of the direction selector element 35 thereof, but in the event that the front wheels Wf, Wf lock, since the rotation speed Nf of the first clutch element 33 adapted to interlock with the rotation of the front wheels Wf, Wf lowers further, the two-way clutch mechanism 32 is left in the unlocking condition, whereby the vehicle is maintained in the two-wheel drive condition.

(4) Straight-backward Running Operation of the Vehicle

Since the rotating directions of all the components of the power transmission system become opposite when the vehicle runs straight backward, the rotating directions of the first clutch element 33, the second clutch element 34 and the direction selector element 35 of the two-way clutch mechanism 32 become opposite to the rotating directions thereof shown in FIGS. 4B, 4C. However, as with the straight-ahead running operation, the two-way clutch mechanism 32 locks when the rotation speed Nf of the first clutch element 33 exceeds the rotation speed Nr of the direction selector element 35, and the two-way clutch mechanism 32 unlocks when the rotation speed Nf of the first clutch element 33 lowers below the rotation speed Nr of the direction selector element 35. Thus, the vehicle is maintained in the two-wheel drive condition both in the event that the vehicle runs straight backward at a constant speed and in the event that the front wheels Wf, Wf lock when the brakes are applied while the vehicle is running straight backward. In addition, in the event that the front wheels Wf, Wf slip when the vehicle starts up straight backward or is accelerated while the vehicle is running straight backward, the vehicle is switched over to the four-wheel drive condition.

In either of straight-ahead and straight-backward running operations of the vehicle, when the front-wheels Wf, Wf slip, the rotation speed Nf of the first clutch element 33 of the two-way clutch mechanism 32 exceeding the rotation speed Nr of the direction selector element 35 thereof, the vehicle is put in the four-wheel drive condition. However, the rotation speed Nr of the direction selector element 35 is obtained by increasing the rotation speed of the driven shaft 6 by the speed increasing unit 38. Thus, when the rotation speed of the drive shaft 5 exceeds the rotation speed of the sub-drive shaft 6 beyond the speed increasing rate of the speed increasing unit 38 that the two-way clutch mechanism 82 locks. Consequently, even if there occurs a slight difference in rotation between the front wheels Wf, Wf and the rear wheels Wr, Wr when the vehicle makes a tight turn or is driven to be parked in a parking slot, the two-way clutch 32 still remains unlocking. As a result, the vehicle is maintained in the two-wheel drive condition, and a tight corner braking phenomenon can be avoided, whereby an increase in the fuel consumption of the engine can be prevented.

Next, referring to FIG. 6, a second embodiment of the invention will be described.

Figure 6:
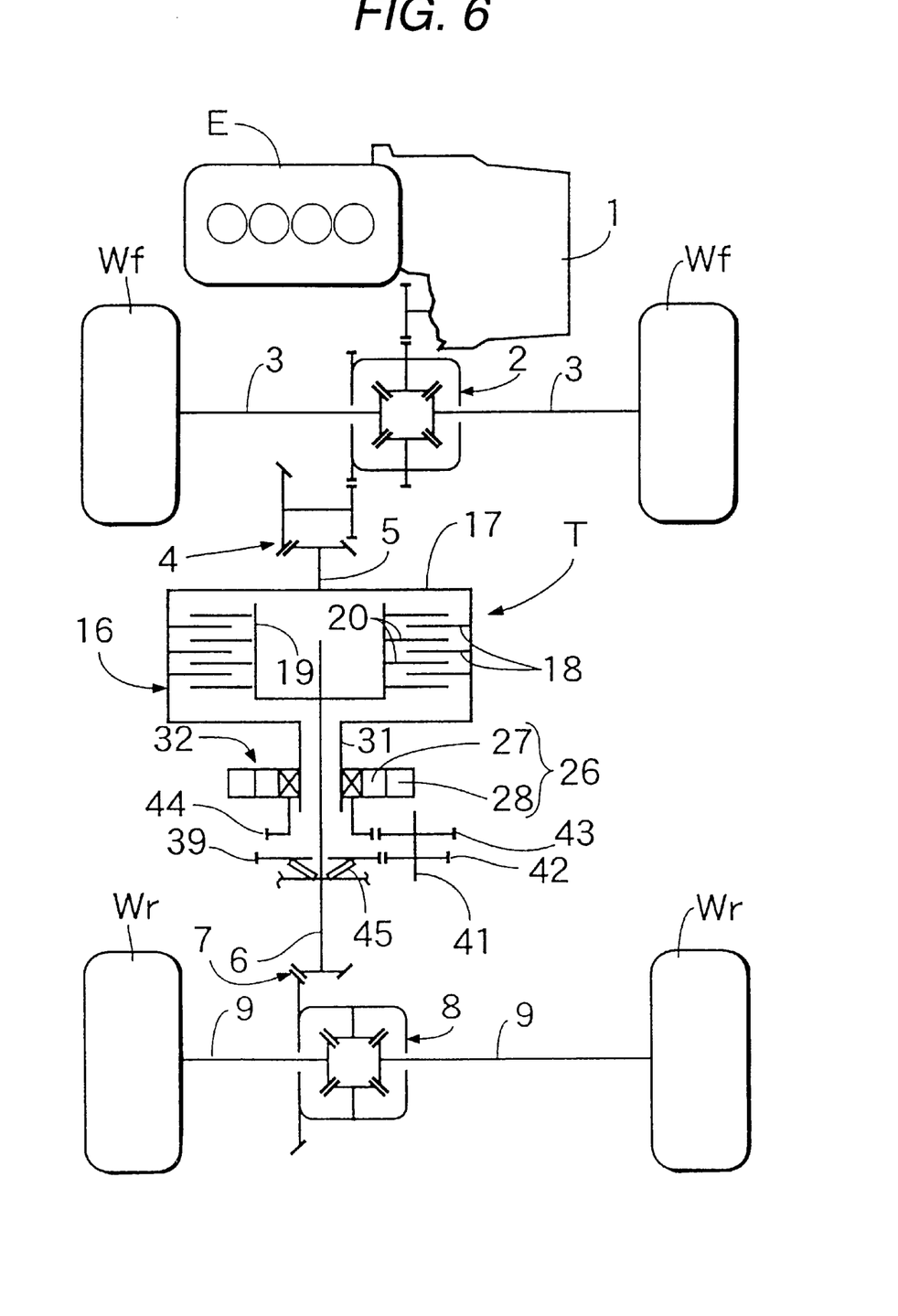
FIG. 6 is a diagram showing the overall construction of a power transmission system of a four-wheel drive vehicle according to a second embodiment of the invention.

As is clear when FIGS. 1 and 6 are compared to each other, the cloned disc spring 45 is disposed between the second gear 42 and the third gear 43 as the speed increasing unit 38 in the first embodiment, but in the second embodiment, a cloned disc spring 45 is disposed between a driven shaft 6 and a first gear 41 as a friction member, and similar function and effectiveness to those of the first embodiment can be attained.

Figure 7A:
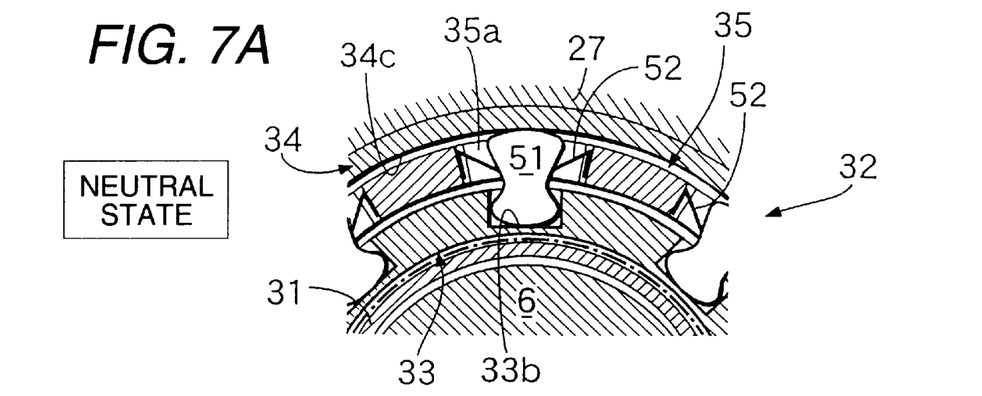
FIGS. 7A to 7C are diagrams showing a two-way clutch mechanism according to a third embodiment of the invention.

Next, referring to FIG. 7, a third embodiment of the invention will be described.

A two-way clutch mechanism according to the third embodiment includes a first clutch element 33, a second clutch element 34, a direction selector element 35 and sprags 51 . . . The first clutch element 33 is connected to a sleeve 31, the second clutch element 34 to an inner rotor 27 of a hydraulic pump 26, and the direction selector element 35 to a speed increasing unit 38. Radially inner ends of the sprags 51 fitted in pocket 35a . . . of the direction selector element 35 fit in recessed portions 33b . . . formed in the outer circumference of the first clutch element 33, and radially outer ends of the sprags 51 abut against the inner circumference of an arc-like surface 34c of the second clutch element 34. Springs 52 . . . are provided on sides of the respective pockets 35a . . . so as to abut against sides of the sprang 51, and the direction selector element 35 is biased toward a neutral position (refer to FIG. 7A) relative to the first clutch element 33 by virtue of the spring force of the springs 52 . . . The relative rotation angle of the direction selector element 35 relative to the first clutch element 33 is controlled through the engagement between a pin and a notch which are not shown.

Figure 7B:
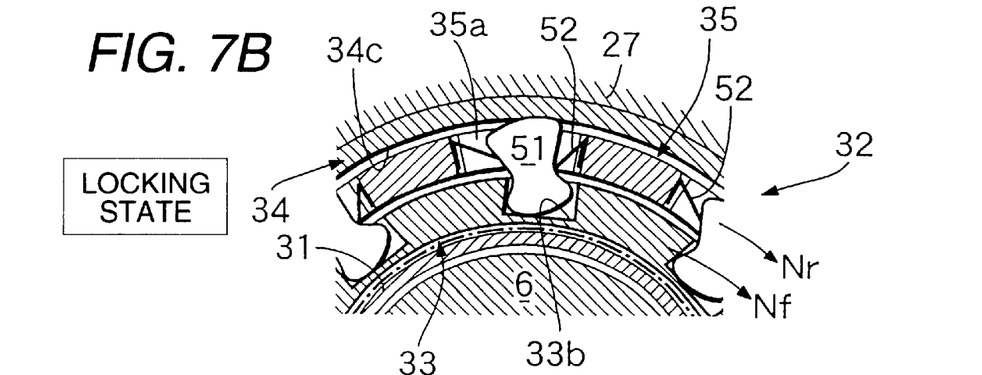
Figure 7C:
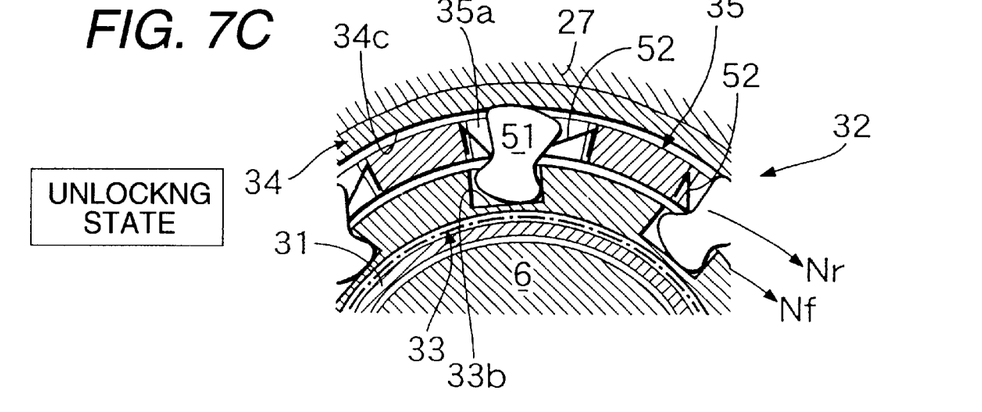

As shown in FIGS. 7B, 7C, when the vehicle runs straight ahead, both the first clutch element 33 of the two-way clutch mechanism 32 connected to the drive shaft 5 via a clutch outer 17 and the sleeve 31 and the direction selector element 35 connected to the driven shaft 6 via the speed increasing unit 38 rotate in directions designated by arrows. At this time, as shown in FIG. 7B, in the event that the rotation speed Nf of the first clutch element 33 exceeds the rotation speed Nr of the direction selector element 35, the direction selector element 35 deviates the phase thereof to a delay side of the rotating direction relative to the first clutch element 33, and the two-way clutch mechanism 32 locks, the driving of the hydraulic pump 26 being thereby effected. Additionally, as shown in FIG. 7C, in the event that the rotation speed Nr of the direction selector element 35 exceeds the rotation speed Nf of the first clutch element 33, the direction selector element 35 deviates the phase thereof toward an advance side of the rotating direction relative to the first clutch element 33, and the two-way clutch unlocks, the driving of the hydraulic pump 26 being thereby interrupted.

Thus, according to the two-way clutch mechanism 32 of the third embodiment, similar functions to those of the two-way clutch mechanism 32 according to the first embodiment can be provided.

While the embodiments of the invention have been described heretofore, various modifications in design can be made to the invention without departing the spirit and scope thereof.

For example, while in the embodiments, the rotation speed of the driven shaft 6 is increased by the speed increasing unit 38 for transmission to the direction selector element 35 of the two-way clutch mechanism 32, the rotation of the driven shaft 6 may be transmitted to the direction selector element 35 as it is.

Thus, according to a first aspect of the invention, there is provided a power transmission device for a four-wheel drive vehicle comprising main drive wheels to which the torque of an engine is directly transmitted and sub-drive wheels to which a part of the torque of the engine is indirectly transmitted via a drive shaft, a hydraulic clutch and a driven shaft, wherein the hydraulic clutch locks under hydraulic pressure generated by a hydraulic pump driven by the drive shaft via a two-way clutch mechanism, the power transmission device being characterized in that, the two-way clutch locks when the rotation speed of the drive shaft exceeds the rotation speed of the driven shaft, irrespective of the rotating direction of the drive shaft, so as to drive the hydraulic pump.

According to the above construction, the two-way clutch mechanism is put in a non-locking condition at the time of straight-ahead constant speed running operation of the vehicle where the rotation speed of the main drive wheels coincides with the rotation speed of the sub-drive wheels and also at the time of braking operation of the vehicle which is running straight ahead where the rotation speed of the main drive wheels lowers below the rotation speed of the sub-drive wheels. As a result of this, the hydraulic pump is disengaged from the driving shaft and outputs no hydraulic pressure, and therefore, the hydraulic clutch is put in a non-locking condition, whereby the vehicle is maintained in a two-wheel drive condition.

On the other hand, the two-way clutch mechanism is put in a locking condition at the time of straight-ahead start-up and accelerating operations of the vehicle where the rotation speed of the main drive wheels exceeds the rotation speed of the sub-drive wheels, and therefore, the hydraulic pump is driven by the drive shaft to output a hydraulic pressure, and the hydraulic clutch is put in a locking condition, whereby the vehicle is switched over to a four-wheel drive condition.

Although the rotating direction of the respective components of the power transmission device when the vehicle runs straight backward becomes opposite to that when the vehicle runs straight ahead, the two-way clutch mechanism locks when the rotation speed of the drive shaft exceeds that of the driven shaft, irrespective of the rotating direction of the drive shaft, and therefore, as in the case of straight-ahead running operation, the two-way clutch mechanism is put in the non-locking condition at the time of straight-backward constant speed running operation of the vehicle and also at the time of braking operation of the vehicle which runs straight backward, whereby the vehicle can be maintained in the two-wheel drive condition, whereas the two-way clutch mechanism is put in the locking condition at the time of straight-backward start-up and accelerating operations of the vehicle, whereby the vehicle can be switched over to the four-wheel drive condition.

Then, there being no chance of the torque which is transmitted from the main drive wheels to the sub-drive wheels directly acting on the two-way clutch mechanism, only a minute torque for driving the hydraulic pump acts on the two-way clutch mechanism, and therefore, the torque transmission capacity of the two-way clutch mechanism can be small, so that the size and production cost of the same mechanism can be attempted at being decreased. Additionally, only one hydraulic pump is required, and therefore, this can contribute to the reduction of the number of components used in the two-way clutch mechanism, the man hours involved in assembling the components into the same mechanism, the weight of the mechanism and the production cost thereof. Moreover, the hydraulic pump is designed to be actuated only when the rotation speed of the main drive wheels exceeds the rotation speed of the sub-drive wheels, and therefore, energy needed to drive the hydraulic pump can be maintained as small as possible, whereby the fuel consumption of the engine can be reduced to save on fuel used.

According to a second aspect of the invention, there is provided a power transmission device for a four-wheel drive vehicle as set forth in the first aspect above, wherein the two-way clutch mechanism comprises a first clutch element connected to the drive shaft, a second clutch element connected to the hydraulic pump and a direction selector valve connected to the driven shaft via a friction member in such a manner as to allow a slip.

According to the above construction, the direction selector element is connected to the driven shaft via the friction member in such a manner as to allow a slip, and therefore, even when the difference in rotation speed between the main drive wheels and the sub-drive wheels, a risk of an excessive load being applied to the direction selector element can be eliminated, thereby making it possible to securely maintain the durability of the two-way clutch mechanism.

According to a third aspect of the invention, there is provided a power transmission device for a four-wheel drive vehicle as set forth in the second aspect above, wherein a speed increasing unit is interposed-between the direction selector element of the two-way clutch mechanism and the driven shaft for increasing the rotation speed of the driven shaft for transmission to the direction selector element.

According to the above construction, the rotation speed of the driven shaft is increased by the speed increasing unit for transmission to the direction selector element, and therefore, it is not until the rotation speed of the main drive wheels exceeds the rotation speed of the sub-drive wheels beyond the speed increasing rate of the speed increasing unit that the two-way clutch locks. Consequently, even if a slight difference in rotation speed between the main drive wheels and the sub-drive wheels occurs when the vehicle makes a tight turn or is driven to be parked in a parking slot, since the two-way clutch mechanism does not lock, a tight corner braking phenomenon can be avoided, whereby the vehicle is prevented from being put in the four-wheel drive condition unnecessarily, thereby making it possible to reduce the fuel consumption of the engine to save on fuel used.

According to a fourth aspect of the invention, there is provided a power transmission device for a four-wheel drive vehicle as set forth in the first aspect above, wherein the two-way clutch mechanism is disposed coaxially in the interior of the hydraulic pump.

According to the above construction, since the two-way clutch is disposed coaxially in the interior of the hydraulic pump, the axial dimension of the power transmission device can be reduced.

What is claimed is:

1. A power transmission device for a four-wheel drive vehicle, comprising:

a drive shaft interlockingly rotatable with main drive wheels to which the torque of an engine is directly transmitted;

a driven shaft interlocking rotatable with sub-drive wheels to which a part of the torque of the engine is indirectly transmitted;

a hydraulic clutch performing transmission and interruption of torque between said drive shaft and said driven shaft;

a two-way clutch mechanism locking when the rotation speed of said drive shaft exceeds the rotation speed of said driven shaft, irrespective of the rotating direction of said drive shaft; and a hydraulic pump generating hydraulic pressure for the locking of said hydraulic clutch when said two-way clutch mechanism is locked.

2. A power transmission device for a four-wheel drive vehicle as set forth in claim 1, wherein said two-way clutch mechanism comprises:

a first clutch element connected to said drive shaft;

a second clutch element connected to said hydraulic pump; and a direction selector element connected to said driven shaft via a friction member in such a manner as to allow a slip.

3. A power transmission device for a four-wheel drive vehicle as set forth in claim 2, wherein a speed increasing unit is interposed between said direction selector element of said two-way clutch mechanism and said driven shaft, for increasing the rotation speed of said driven shaft for transmission to said direction selector element.

4. A power transmission device for a four-wheel drive vehicle as set forth in claim 1, wherein said two-way clutch mechanism is disposed coaxially in the interior of said hydraulic pump.

* * * * *